United States Patent
Norheim

(10) Patent No.: US 10,480,540 B2
(45) Date of Patent: Nov. 19, 2019

(54) DOUBLE-ACTING CYLINDER

(71) Applicant: KONGSBERG AUTOMOTIVE AS, Kongsberg (NO)

(72) Inventor: Daniel Norheim, Kongsberg (NO)

(73) Assignee: KONGSBERG AUTOMOTIVE AS, Kongsberg (NO)

( * ) Notice: Subject to any disclaimer, the term of this patent is extended or adjusted under 35 U.S.C. 154(b) by 0 days.

(21) Appl. No.: 15/755,775

(22) PCT Filed: Sep. 22, 2015

(86) PCT No.: PCT/EP2015/071785
§ 371 (c)(1),
(2) Date: Feb. 27, 2018

(87) PCT Pub. No.: WO2017/050356
PCT Pub. Date: Mar. 30, 2017

(65) Prior Publication Data
US 2019/0024680 A1    Jan. 24, 2019

(51) Int. Cl.
*F15B 11/12* (2006.01)
*F16H 61/30* (2006.01)
(Continued)

(52) U.S. Cl.
CPC ......... *F15B 11/123* (2013.01); *F15B 15/1409* (2013.01); *F15B 15/24* (2013.01);
(Continued)

(58) Field of Classification Search
CPC ....... F15B 11/12; F15B 11/121; F15B 11/122; F15B 11/123; F15B 11/125; F15B 11/126;
(Continued)

(56) References Cited

U.S. PATENT DOCUMENTS 2,915,043 A * 12/1959 Neiner ............... F15B 15/227
188/285
3,031,853 A    5/1962 Olson
(Continued)

FOREIGN PATENT DOCUMENTS

| DE | 2917232 A1 | 11/1979 |
|----|------------|---------|
| DE | 202005005508 U1 | 6/2005 |
| EP | 2843267 A1 | 3/2015 |

OTHER PUBLICATIONS

Machine translation of DE 2917232 from espacenet. 1979.*
International Search Report for Application No. PCT/EP2015/071785 dated Jun. 23, 2016, 2 pages.
English language abstract for DE2917232A1 extracted from espacenet.com database on Mar. 19, 2018, 1 page.
(Continued)

*Primary Examiner* — Thomas E Lazo
*Assistant Examiner* — Michael Quandt
(74) *Attorney, Agent, or Firm* — Howard & Howard Attoneys PLLC

(57) ABSTRACT

Disclosed and claimed is a double-acting cylinder comprising a cylinder housing, a first floating piston, a second floating piston and a central piston which is movable to three stationary positions along an actuation direction of the cylinder. A movement of the floating pistons in the cylinder bore is delimited by end stop arrangements. A movement of the central piston in the cylinder bore is delimited by the first and the second floating piston. Each floating piston comprises a first section and a second section. A circumferential length of the floating pistons is greater in the first section than in the second section. In the first sections a first seal is arranged for a sealing engagement with an inner wall of the cylinder bore. In the second sections a second seal is arranged for a sealing engagement with the inner wall of the cylinder bore or an inner wall of the central piston.

9 Claims, 4 Drawing Sheets

Figure 1:
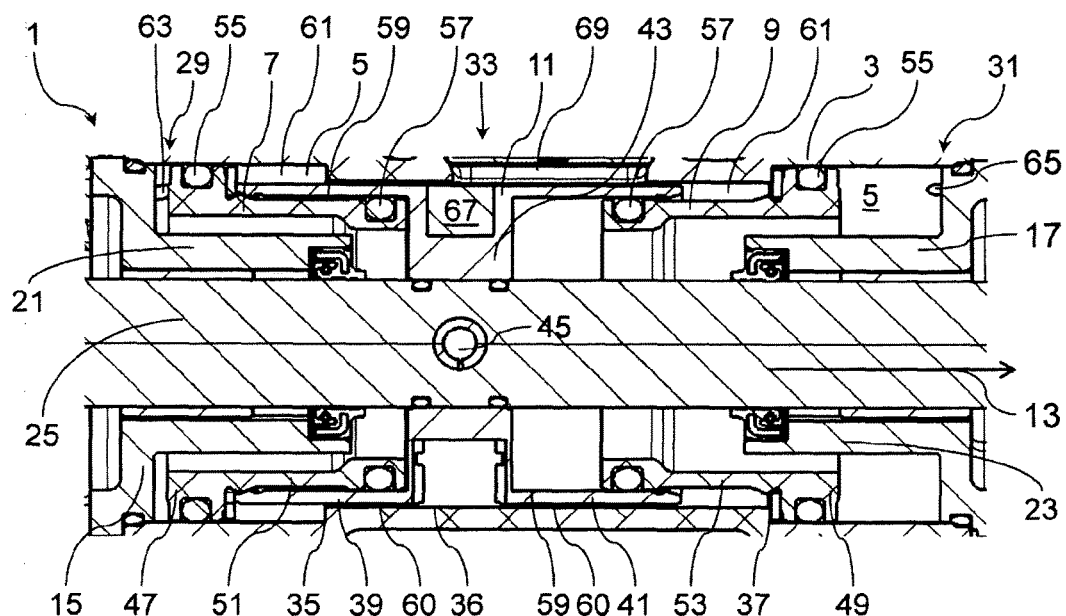

(51) Int. Cl.
    *F15B 15/28*       (2006.01)
    *F15B 15/14*       (2006.01)
    *F15B 15/24*       (2006.01)

(52) U.S. Cl.
    CPC .......... *F15B 15/2861* (2013.01); *F16H 61/30* (2013.01); *F16H 2061/307* (2013.01)

(58) Field of Classification Search
    CPC ....... F15B 11/127; F15B 11/128; F15B 11/18; F15B 11/183; F15B 11/186; F15B 15/1409; F16H 61/30; F16H 2061/307; Y10T 74/19326
    USPC .................................................. 92/52, 62, 65
    See application file for complete search history.

(56) References Cited

U.S. PATENT DOCUMENTS

| | | | |
|---|---|---|---|
| 3,312,146 A | | 4/1967 | Quere et al. |
| 4,716,815 A | * | 1/1988 | Stewart ................. F15B 11/123 251/250 |
| 6,892,598 B2 | * | 5/2005 | Mepham ................. F16H 61/30 74/335 |
| 7,650,828 B2 | | 1/2010 | Rau et al. |

OTHER PUBLICATIONS

English language abstract for DE202005005508U1 extracted from espacenet.com database on Mar. 19, 2018, 1 page.
Computer-generated English language abstract for EP2843267A1 extracted from espacenet.com database on Mar. 19, 2018, 3 pages.

* cited by examiner

DOUBLE-ACTING CYLINDER

The subject application is the National Stage of International Patent Application No. PCT/EP2015/071785, filed on Sep. 22, 2015, the contents of which are incorporated herein by reference in their entirety.

The present invention relates to a double-acting cylinder comprising a cylinder housing, a first floating piston, a second floating piston and a central piston which is movable to three stationary positions along an actuation direction of the cylinder. The cylinder housing defines a cylinder bore which extends along the actuation direction and is delimited on opposing ends by a first and a second cylinder cap, respectively. A movement of the first floating piston in the cylinder bore along the actuation direction of the cylinder is delimited towards the second floating piston by a first end stop arrangement. A movement of the second floating piston in the cylinder bore along the actuation direction of the cylinder is delimited towards the first floating piston by a second end stop arrangement. A movement of the central piston in the cylinder bore along the actuation direction of the cylinder is delimited by the first and the second floating piston.

Double-acting cylinders with a central piston that can attain three different stationary positions along an actuation direction, also simply referred to as a cylinder with three stable positions, are cylinders in which a working fluid may act on one of two sides of a central piston or on both sides simultaneously. Depending on which side of the central piston the working fluid acts on, the central piston moves to one of three stable positions and retains this position as long as the distribution of the working fluid in the cylinder is maintained. Such cylinders can, for example, be used in automatic transmissions for selecting the gears, e.g., drive (D), neutral (N) and reverse (R).

A double-acting cylinder with a central piston having three stationary positions along an actuation direction is described, for example, in U.S. Pat. No. 3,312,146. The double-acting cylinder comprises a housing in which the central piston and a first and second floating piston are arranged. A bore defined by the housing comprises a first, a second and a central section. The first and the second section are formed on opposing sides of the central section and have a cross-sectional area in a plane extending perpendicular to the actuation direction exceeding a cross-sectional area of the bore in the central section. In other words, the opening formed by the bore is wider in the first and second section than in the central section.

The first floating piston is arranged in the first section of the bore and movable in the actuation direction between a first cylinder cap and a first end stop. The first end stop arrangement is formed by the difference in the cross-sectional area between the first and the central section of the bore. Likewise, the second floating piston is arranged in the second section of the bore where it is movable between a second end stop formed by the housing at the transition between the second and the central section of the bore and a second cylinder cap. The central piston is arranged between the first and the second floating piston such that its maximum movement in the direction of the actuation direction is limited by the position of the floating pistons.

The central piston of the prior art double-acting cylinder can take three different stable positions, a first, a second and a central position, defined by respective positions of the floating pistons. If both floating pistons are at their respective end stops due to the pressure distribution of a working fluid in the cylinder, the central piston is in the central position. If the first floating piston has been moved by the working fluid to the first cylinder cap and the second floating piston has been moved to the second end stop by the working fluid, the central piston is in the first position. And if the first floating piston has been moved to the first end stop and the second floating piston has been moved to the second cylinder cap by the working fluid, the central piston is in the second position. In order to make sure that the central piston continues to move once the floating pistons have reached their respective end stops, both floating pistons comprise an opening through which a working fluid may flow into a space between the floating pistons and the central piston.

If the central piston is, for example, in the first position, the working fluid can be injected into to the first section of the bore between the first cylinder cap and the first floating piston. The pressure of the working fluid will act on an outer surface of the first floating piston and should move it in the actuation direction towards the first end stop. If the first floating piston moves in the intended direction depends on the resulting force acting on the floating piston. In the first position three main forces act on the first floating piston: a force created by the pressure of the working fluid acting on the outer surface, a force created by pressure of a working fluid acting on an inner surface of the first floating piston facing towards the central piston and a force created by pressure acting on a second surface of the central piston facing towards the second floating piston. In the above example, any working fluid accumulating between the inner surface of the first floating piston and the first end stop acts with at least some pressure on the first floating piston and reduces the resulting force. Furthermore, any pressure applied to the second surface of the central piston will also reduce the resulting force.

As can be seen from the above considerations, the double-acting piston known from the prior art has several disadvantages. The major disadvantage is the identical surface area of the inner and the outer surface of the floating pistons. The larger the surface area of the inner area compared to the outer surface area, the greater the force acting on the floating piston from any working fluid accumulating between the inner surface of the floating piston and the central piston. This may reduce the speed of the floating piston and, therefore, increase the time it requires to move the central position between its stable positions. Furthermore, in particular if a rapid switching between different stable positions is required, the floating pistons may be too slow for following the movement of the central piston. As the central position is only defined by the position of the floating pistons, the central position may not be stable or not be accurately defined.

It is, therefore, an object of the present invention to provide a double-acting cylinder with a central piston having three stationary positions which overcomes some of the problems of the prior art.

The problem is solved by a double-acting cylinder of the kind described above in which each floating piston comprises a first section and a second section. A circumferential length of the first floating piston in a plane extending perpendicular to the actuation direction of the cylinder is greater in the first section than in the second section and a circumferential length of the second floating piston in a plane extending perpendicular to the actuation direction of the cylinder is greater in the first section than in the second section. In the first section of each floating piston a first seal is arranged for a sealing engagement with an inner wall of the cylinder bore. In the second section of each floating piston a second seal is arranged for a sealing engagement with the inner wall of the cylinder bore or an inner wall of the central piston.

In other words, a double-acting cylinder according to the present invention comprises a cylinder housing and a piston arrangement comprising two floating pistons and a central piston. All pistons are arranged in the cylinder housing. The shape of the pistons and of the housing limits all of the pistons to a linear movement along an actuation direction. Along the actuation direction the pistons are arranged in the order of the first floating piston, the central piston and finally the second floating piston. The pistons are, thus, all aligned along the actuation direction and the central piston is interposed between the first and the second floating piston.

The entire piston arrangement is itself arranged between a first and a second cylinder cap. More precisely, the first floating piston is arranged between the first cylinder cap and the central piston and the second floating piston is arranged between the second cylinder cap and the central piston. The main function of the cylinder caps can be sealing the cylinder housing to prevent working fluid from spilling into the environment. The double-acting cylinder comprises at least two openings in the cylinder housing through which a working fluid can be ingested into the cylinder bore on opposing sides of the central piston.

Each of the floating pistons is movable between two stable end positions. One of the stable end positions is defined by the first and second end stops, respectively, whereas the other stable end position is defined by a first and a second outer stopping arrangement, respectively, which can, for example, be formed by the respective cylinder caps. Thus, in a preferred embodiment the movement of the first floating piston in the cylinder bore along the actuation direction of the cylinder and away from the second floating piston is delimited by the first cylinder cap and wherein the movement of the second floating piston in the cylinder bore along the actuation direction of the cylinder and away from the first floating piston is delimited by the second cylinder cap. In other words, the first cylinder cap prevents the first floating piston and, thereby, the entire piston arrangement from moving out of the cylinder bore at the cylinder bore's end closed by the first cylinder cap. Likewise, the second cylinder cap prevents the second floating piston and, thereby, also the remainder of the piston arrangement from moving out of the cylinder bore to the other end.

The central piston to which a piston rod can be connected is movable between a first position, a second position and a central position. Each of these three positions is only stable due to the interplay of the floating pistons and the pressure distribution of a working fluid which is used to operate the double-acting cylinder as explained above with respect to the prior art double-acting cylinder.

Each of the floating pistons comprises two sections, the two sections dividing the floating pistons in two parts in the actuation direction. A first section of each floating piston is arranged further away from the central piston and, thus, the other floating piston than a second section. In other words, the first section of the first floating piston is arranged closer to the first outer stopping arrangement and the first cylinder cap than the second section of the first floating piston. Likewise, the first section of the second floating piston is arranged closer to the second outer stopping arrangement and the second cylinder cap than the second section of the second floating piston. The first and the second section of the floating pistons differ in their respective outer circumference or circumferential length. In other words, a cross-sectional area of the floating piston in a plane extending perpendicular to the actuation direction is larger in the first section than in the second section. If, for example, the floating piston has a circular cross-section in a plane extending perpendicular to the actuation direction, a diameter of the cross-section is greater in the first section than in the second section.

Each of the sections comprises a seal, for example, in form of an O-ring or a lip seal. The seals have to be sufficiently tight for preventing any working fluid used to operate the double-acting cylinder to pass between the floating piston and the respective surface with which the seal engages. The first and second seals are part of the respective floating pistons and included when an outer circumference of the floating piston is determined. A first seal which is arranged in the first section of each floating pistons is provided for a sealing engagement with an inner wall of the cylinder housing, i.e., a wall of the cylinder housing delimiting the cylinder bore. A second seal is arranged in the second section of each floating piston. It is in sealing engagement with either an inner wall of the cylinder housing or an inner wall of the central piston.

Thereby, a cavity is created between an outer surface of the floating pistons and the inner wall of the housing and in some embodiments the inner wall of the central piston. The cavity can be vented by respective openings in the cylinder housing and will, therefore, generally be referred to as a vented cavity. The vented cavity is sealed from the remainder of the interior of the cylinder bore and, in particular, from those sections which are filled with a working or hydraulic fluid in operation. Thus, during operation of the double-acting cylinder no working fluid will enter the vented cavity.

Each floating piston has an effective outer surface area and an effective inner surface area. The effective outer surface area is the surface area of the piston which can come into contact with the working fluid and which faces towards the adjacent cylinder cap projected on a plane which extends perpendicular to the actuation direction. It is the area effectively available for the working fluid to act on for moving the floating piston in a direction facing away from the adjacent cap, i.e., towards the other floating piston. The effective inner surface area is the surface area of the piston which can come into contact with the working fluid and which faces away from the adjacent cylinder cap projected on a plane extending perpendicular to the actuation direction. This is the area effectively available for the working fluid to act onto for moving the floating piston in a direction facing towards the adjacent cap, i.e., away from the other floating piston.

As a vented cavity is created the effective outer surface area of each floating piston is larger than the effective inner surface area of each floating piston. Thus, the above problems of nearly equal forces acting on both sides of a floating piston due to identical dimensions of the effective inner and outer surface areas are advantageously reduced.

In other words, the double-acting cylinder according to the present inventions comprises two floating pistons each having two sections of different dimensions. Each of the sections is sealed independently against the inner wall of the cylinder bore or the inner wall of the central piston, respectively. This prevents working fluid from ingression into the space or cavity formed between the first seal, the second seal, an outer wall of the floating piston and the inner wall of the cylinder bore and in some embodiments the inner wall of the central piston. Thereby, the effective outer surface area of each floating piston is larger than the effective inner surface area of the floating piston ensuring fast and reliable operation. Furthermore, the first and second seal advantageously support the floating pistons against any tilting movement relative to a plane extending perpendicular to the actuation direction. In other words, providing the floating piston with two sections wherein each section is independently supported against an inner surface prevents a tipping and, therefore, jamming of the double acting cylinder.

In a preferred embodiment the first end stop arrangement is attached to the first cylinder cap and the second end stop arrangement is attached to the second cylinder cap. In other words, a movement of the first floating piston away from the first cylinder cap is prevented by an end stop arrangement which is part of the first cylinder cap. Hence, no end stop arrangements have to be provided on an inner wall of the cylinder bore which reduces the complexity of manufacturing the cylinder bore and also the production cost. Thus, a cross sectional area of the cylinder bore in a plane extending perpendicular to the actuation direction is preferably constant between the first cylinder cap and the second cylinder cap. Assuming that the shape of the cylinder bore does not change between the cylinder caps of the cylinder bore, this would be the same as a cylinder bore having a constant circumferential length in a plane extending perpendicular to the actuation direction between the cylinder caps. If, for example, the cylinder housing as the shape of a hollow cylinder, the cross-sectional area of the cylinder bore would be of circular shape with a constant radius and, thus, circumference. This embodiment is particularly advantageous as it is easy to manufacture and the outer dimensions can be considerably reduced as compared to prior art double-acting cylinders no section of the cylinder bore has a reduced diameter.

It is further preferred that each cylinder cap comprises a guiding section which extends from the respective cylinder cap towards the central piston and which is spaced from an inner wall of the cylinder bore. The first end stop arrangement is formed by a protrusion arranged at the guiding section of the first cylinder cap and the second end stop is formed by a protrusion arranged at the guiding section of the second cylinder cap. The guiding sections extend, for example, along the center of the cylinder bore. Each floating pistons can, for example, extend in an annularly closed shape around the respective guiding section. The guiding section in turn can extend in an at least partially closed annular shape about the piston rod. Both the piston rod and the floating piston can be guided by the guiding section. Each end stop arrangement is formed at a free end of the respective guiding section and facing towards the central piston and the other cylinder cap. The end stop arrangements are formed as a protrusion extending, for example, radially or laterally away from the respective guiding sections towards the inner wall of the cylinder bore. In an exemplary embodiment the protrusions are ring-shaped. This end stop design requires very little additional space and it propose a rather simple solution that can be easily realized and produced. Further, the assembly of the parts of the double-acting cylinder becomes relatively easy.

In an alternative, preferred embodiment the cylinder bore comprises a first section, a second section and a central section, wherein an inner circumferential length of the cylinder bore in a plane extending perpendicular to the actuation direction in the first and the second section is greater than a circumferential length of the cylinder bore in a plane extending perpendicular to the actuation direction in the central section, and wherein a transition from the first section to the central section forms the first end stop arrangement and a transition from the second section to the central section forms the second end stop arrangement. For example, if the cylinder housing has the form of a hollow cylinder with a circular cross-section, the diameter of the cylinder bore would be less in the central section than in the first and the second section. The diameter of the cylinder bore in the first and the second section is preferably identical.

It is further preferred if the first seal of the first floating piston is arranged for a sealing engagement with the inner wall of the cylinder bore in the first section and the first seal of the second floating piston is arranged for a sealing engagement with the inner wall of the cylinder bore in the second section. In this preferred embodiments O-rings can be used as seals which reduces the production costs as these are readily available on the market and do not have to be specifically designed. Further, the molding and assembly process is relatively uncomplicated in this specific embodiment.

Alternatively it is preferred that the central piston comprises a first flange and a second flange. The first flange extends from the central piston towards the first cylinder cap, is at least partially arranged between the inner wall of the cylinder bore and the second section of the first floating piston and forms the inner wall for sealing engagement with the second seal of the first floating piston. The second flange extends from the central piston towards the second cylinder cap, is at least partially arranged between the inner wall of the cylinder bore and the second section of the second floating piston and forms the inner wall for sealing engagement with the second seal of the second floating piston. Thus, in the preferred embodiment the central piston is of a double-cup-shaped form with the openings of the cups facing away from each other and towards one of the cylinder caps. The inner walls or surfaces of the first and second flange face away from the inner wall of the cylinder. This embodiment has the advantages that the surfaces engaging with the respective second seals are provided on the central piston. Thus, the inner surface of the cylinder bore does not need to be as smooth as if the seal or gasket would be in direct contact with the inner wall.

It is further preferred if an outer wall of the first flange and an outer wall of the second flange form a continuous surface of the central piston towards the inner wall of the cylinder bore. This facilitates a smooth movement of the central piston along the actuating direction.

In a preferred embodiment the central piston comprises a permanent magnet and a position of the permanent magnet along the actuation direction is detectable through the cylinder housing for determining a position of the central piston along the actuation direction. With the permanent magnet it is advantageously possible to detect in which stable position the central piston is arranged. It is further preferred if the cylinder also comprises a sensor for detecting the position of the permanent magnet.

Figure 2:
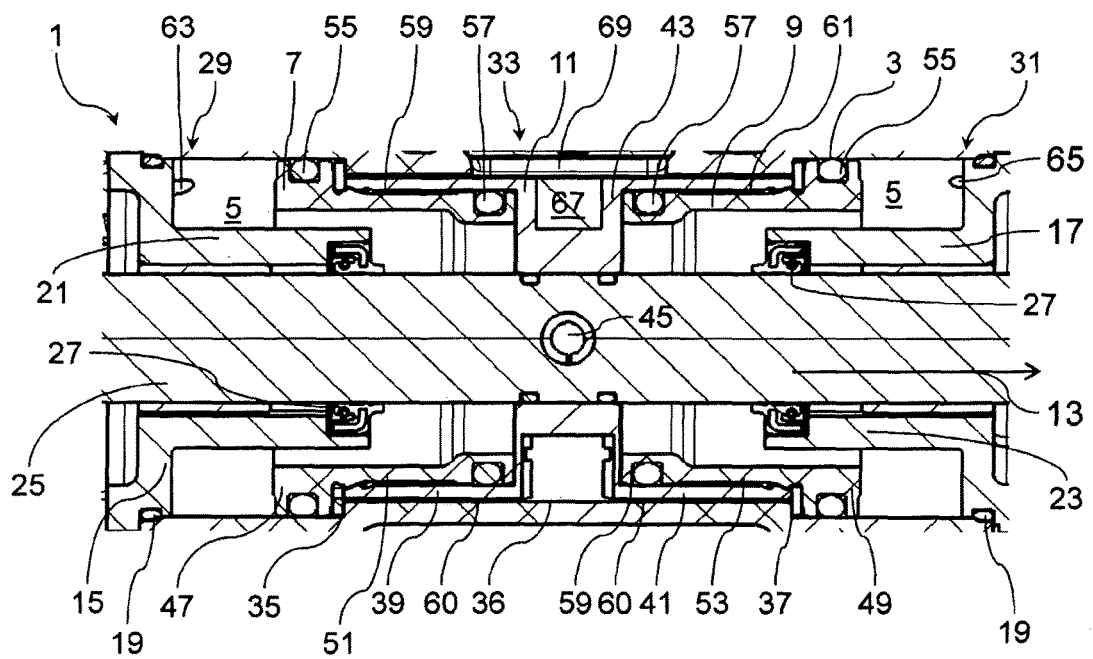
Figure 3:
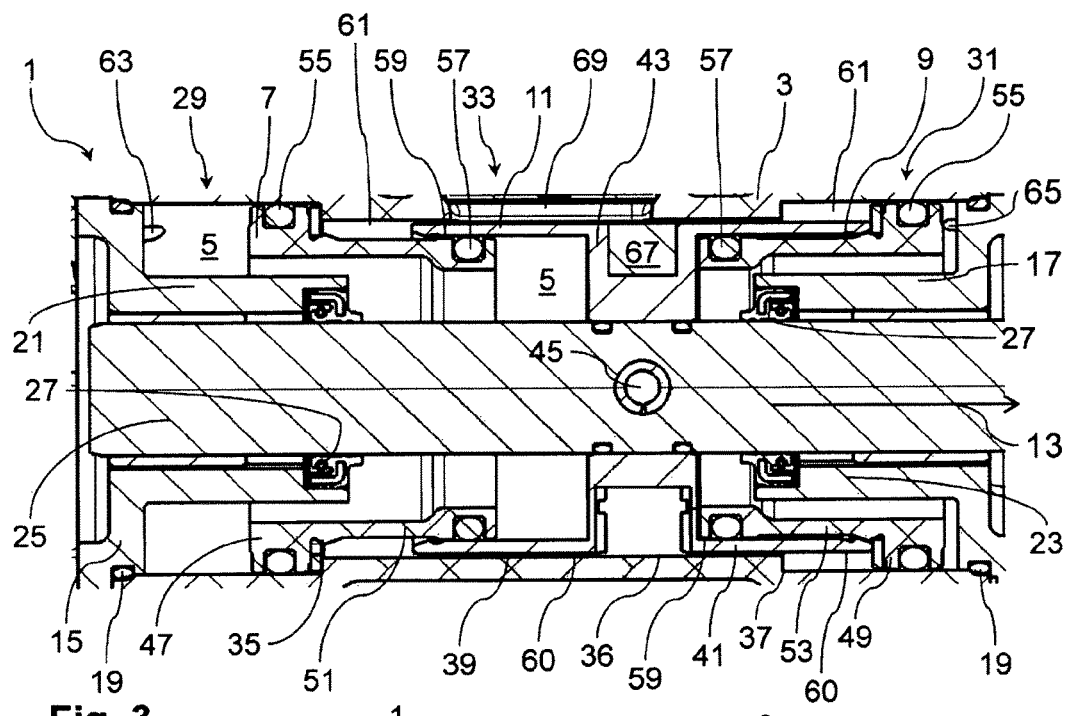
Figure 4:
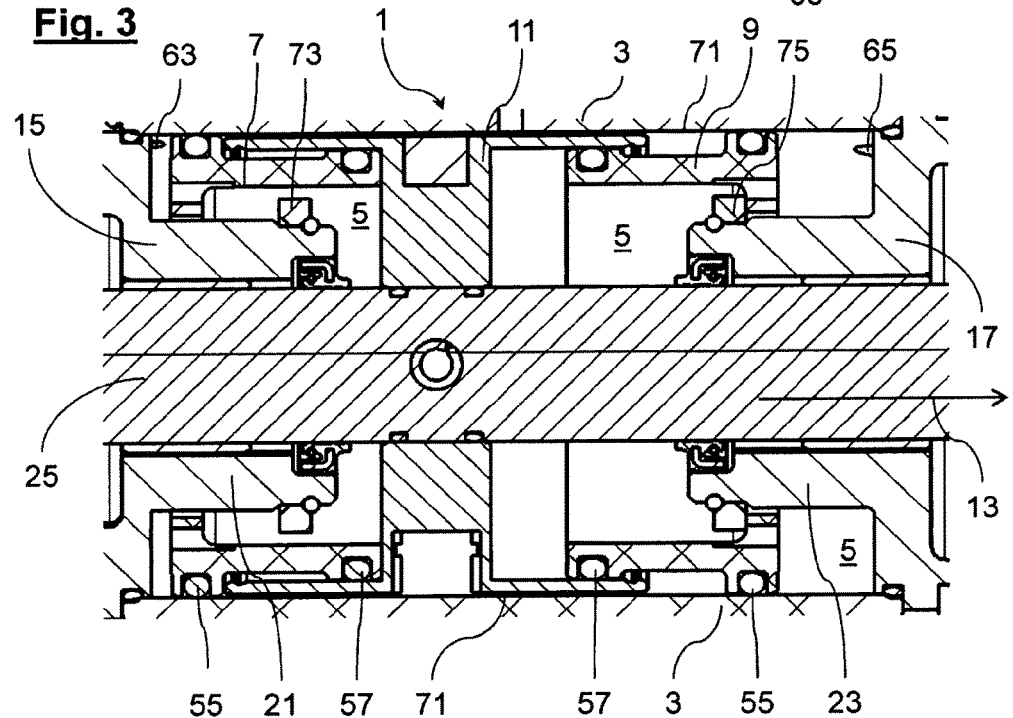
Figures 5, 6:
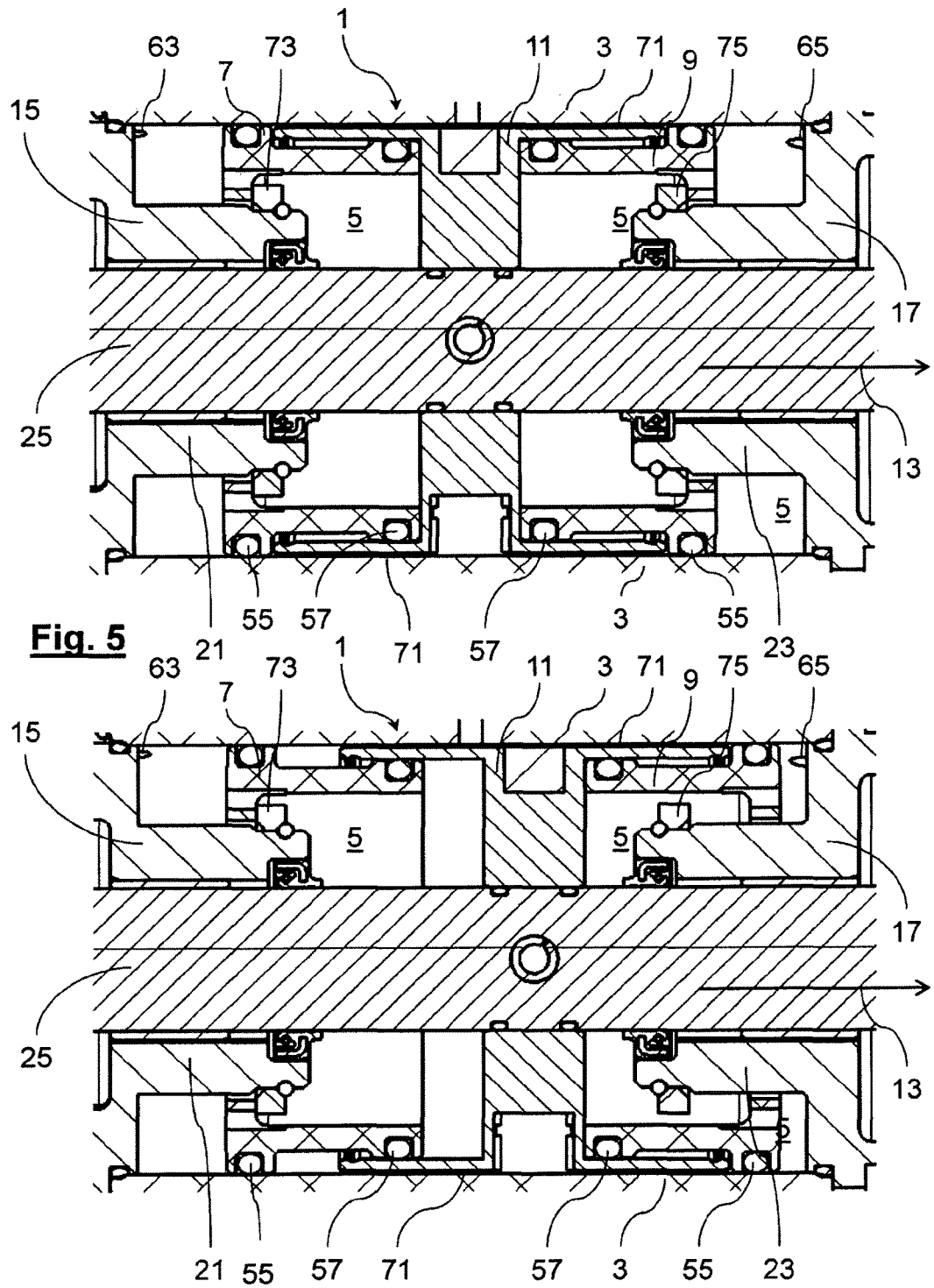
Figure 7:
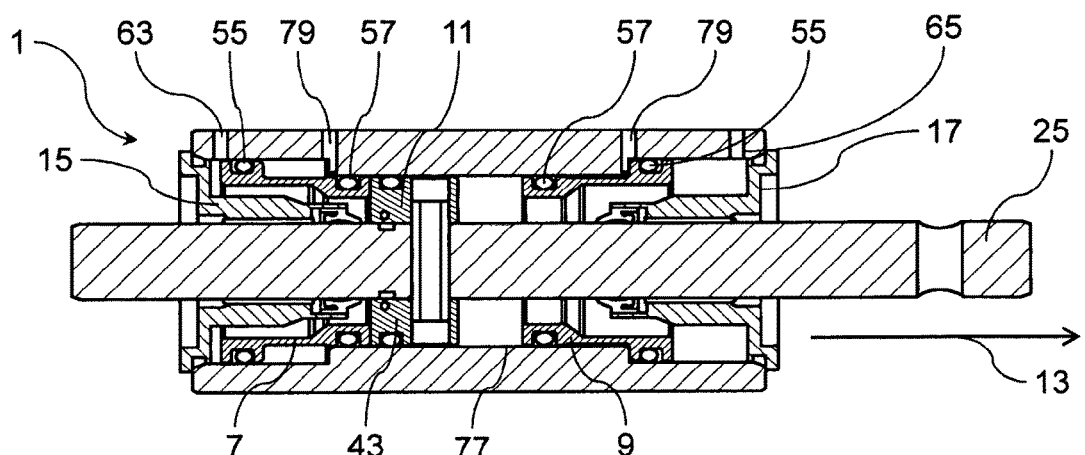
Figure 8:
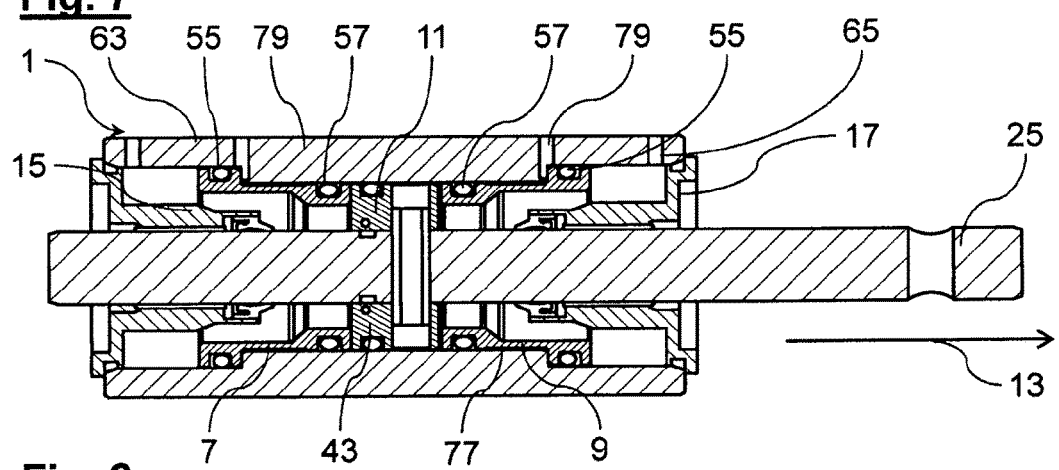
Figure 9:
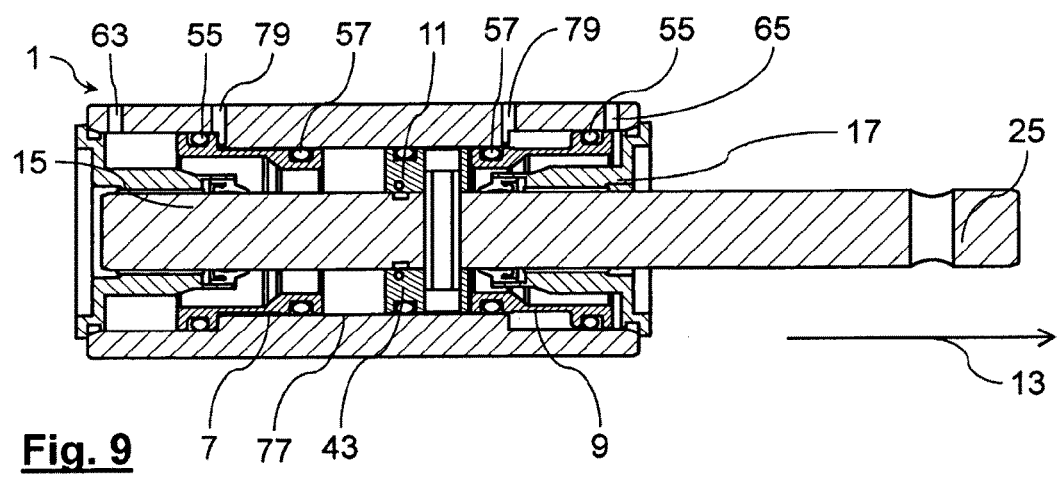

In the following exemplary embodiments of the present invention will be described with reference to the drawings, wherein FIG. 1 shows a first exemplary embodiment of a double-acting cylinder with a central piston in a first stable position, FIG. 2 shows the exemplary embodiment of FIG. 1 with a central piston in a central stable position, FIG. 3 shows the exemplary embodiment of FIGS. 1 and 2 with a central piston in a second stable position, FIG. 4 shows a second exemplary embodiment of a double-acting cylinder with a central piston in a first stable position, FIG. 5 shows the exemplary embodiment of FIG. 4 with a central piston in a central stable position, FIG. 6 shows the exemplary embodiment of FIGS. 4 and 5 with a central piston in a second stable position, FIG. 7 shows a third exemplary embodiment of a double-acting cylinder with a central piston in a first stable position, FIG. 8 shows the exemplary embodiment of FIG. 7 with a central piston in a central stable position and FIG. 9 shows the exemplary embodiment of FIGS. 7 and 8 with a central piston in a second stable position, Throughout the Figures and the various embodiments shown therein like reference numerals will be used to indicate like elements.

With reference to FIGS. 1 to 3 a first exemplary embodiment of a double-acting cylinder 1 according to the present invention will be described in the following paragraphs. The double-acting cylinder 1 comprises a cylinder housing 3 forming a cylinder bore 5 in which a first floating piston 7, a second floating piston 9 and a central piston 11 are arranged. The cylinder housing 3 generally has that shape of a hollow cylinder and extends along an actuation direction 13. Thus, in a plane extending perpendicular to the actuation direction 13 a cross-sectional area of the cylinder bore 5 is generally circular. Other cross-sectional areas such as rectangular, square or oval are also conceivable. The cylinder bore 5, the floating pistons 7, 9 and the central piston numeral 11 are shaped such that only a translational movement along the actuation direction 13 of the pistons 7, 9, 11 relative to the cylinder housing 3 is possible.

The cylinder bore 5 is delimited at opposing ends by first and second cylinder caps 15, 17. The first cylinder cap 15 is arranged on the same side of the central piston 11 as the first floating piston 7 and the second cylinder cap 17 is arranged on the same side of the central piston 11 as the second floating piston 9. In other words, the first floating piston 7 is arranged between the first cylinder cap 15 and the central piston 11 and the second floating piston 9 is arranged between the central piston 11 and the second cylinder cap 17.

The cylinder caps 15, 17 have different functions. Amongst others, they delimit the overall movement of the floating pistons 7, 9 away from the central piston 11 and also prevent accidental spilling of working fluid out of the cylinder bore 5. To this end, seals 19 in form of O-rings are provided for sealing the cylinder caps 15, 17 to the cylinder housing 3. The cylinder caps 15, 17 further comprise guiding sections 21, 23 which extend from the respective cylinder cap 15, 17 towards the central piston 11 and which are provided for guiding a piston rod 25 attached to the central piston 11. To prevent loss of working fluid at the interface between the piston rod 25 and the guiding sections 21, 23 circumferential seals 27 in form of lip seals are provided at free ends of the guiding sections 21, 23 for sealing engagement with the piston rod 25.

The cylinder bore 5 comprises a first section 29, a second section 31 and a central section 33 arranged between the first section 29 and the second section 31. A cross-sectional area in a plane extending perpendicular to the actuation direction 13 is smaller in the central section 33 as in the first and second section 29, 31. In the exemplary embodiment shown in FIGS. 1 to 3 the cross-sectional area of the first and the second section 29, 31 is the same. However, it is also conceivable that their cross-sectional areas differ.

At the transition from the first section 29 to the central section 33 of the cylinder bore 5 a step or edge 35 is formed by an inner wall 36 of the cylinder housing 3. The step 35 serves as a first end stop arrangement 35 limiting a movement of the first floating piston 7 towards the second floating piston 9. A second end stop arrangement 37 is formed by an edge or step 37 in the inner wall 36 of the cylinder housing 3 at the corresponding transition from the second section 31 of the cylinder bore 5 to the central section 33. The second end stop arrangement 37 delimits a movement of the second floating piston 9 towards the first floating piston 7.

The central piston 11 has a double cup-shape wherein openings of the cups face away from each other and towards the cylinder caps 15, 17. In other words, the central piston 11 comprises first and second flanges 39, 41 extending from a core 43 of the central piston 11 towards the first cylinder cap 15 and second cylinder cap 17, respectively. The piston rod 25 is rigidly connected to the core 43 of the central piston 11 by means of a pin or bolt 45. Seals provided between the core 43 of the central piston 11 and the piston rod 25 make sure that no working fluid can flow past the central piston 11, i.e., from one side of the cylinder bore 5 to the other.

Both floating pistons 7, 9 comprise a first section 47, 49 and a second section 51, 53. A circumferential length of an outer surface of the first floating piston 7 in the first section 47 is greater than a circumferential length of the first floating piston 7 in the second section 51. As a cross-section of the floating piston 7 in a plane extending perpendicular to the actuation direction 13 is circular this corresponds to stating that a diameter or cross-sectional area of the first floating piston 7 in the first section 47 is greater than a diameter or cross-sectional area of first floating piston 7 in the second section 51. Likewise, a circumferential length of an outer surface of the second floating piston 9 in the second section 51 is smaller than a circumferential length of an outer surface of the second floating piston 9 in the first section 49. Both floating pistons 7, 9 are provided with first and second seals 55, 57. The first seals 55 are mounted as O-rings at the respective first sections 47, 49 and provided for sealing engagement with the inner wall 36 of the cylinder housing 3. Other O-rings are mounted as corresponding second seals 57 to the second sections 51, 53 of the floating pistons 7, 9. The second seals 57 seal the floating pistons 7, 9 towards an inner wall 59 of the central piston numeral 11 and, to be more precise, the inner wall or surface 59 of the first and second flanges 39, 41. In the embodiments shown in FIGS. 1 to 6 the flanges 39, 41 and the core 43 of the central piston 11 provide an even outer surface 60 towards the inner wall 36 of the cylinder bore 5. As the central piston 11 is guided by the floating pistons 7, 9 it has good clearance to the cylinder wall 36 of the cylinder housing 3.

Hence, the floating pistons 7, 9 form together with the first and second seals 55, 57 and the flanges 39, 41 of the central piston 11 cavities 61 which remain permanently free of working fluid that is used to operate the double-acting cylinder 1. The cavities 61 are connected to the environment of the double-acting cylinder 1 by means of venting holes or openings which are not shown in FIGS. 1 to 3. Through the venting holes air can freely flow into and out of the cavities 61 from the environment. The cavities 61 are, therefore, also referred to as vented cavities 61.

The double-acting cylinder 1 can be operated by ingesting a pressurized fluid or working fluid through control openings 63, 65 in the cylinder housing 3 into the cylinder bore 5. A first control opening 63 is provided for ingesting a hydraulic or working fluid into the part of the cylinder bore 5 in which the first floating piston 7 is arranged. For providing working fluid to the other part of the cylinder bore 5 in which the second floating piston 9 is arranged, a second control opening 65 has been drilled.

In FIG. 1 the central piston 11 is shown in a first position in which the first floating piston 7 and the central piston 11 are arranged as close as possible to the first cylinder cap 15. The second floating piston 9 also has been moved as closely as possible towards the first cylinder cap 15 and is in engagement with the second end stop arrangement 37. In order to keep the central piston numeral 11 stable in the first position as shown in FIG. 1 pressurized working fluid is ingested through the second control opening 65. The working fluid acts on the second floating piston 9 and the central piston 11.

For moving the central piston 11 along with the piston rod 25 from the first (stable) position to the central (stable) position as shown in FIG. 2, pressurized working fluid is ingested through the first control opening 63. If the pressure of the working fluid is at least the same as the pressure of the working fluid provided through the second control opening 65, the central piston 11 will move to the central position due to the larger combined effective surface area of the central piston 11 and first floating piston 7 towards the first cylinder cap 15 compared to the effective surface area of the central piston 11 towards the second cylinder cap 17. The effective surface area of a piston 7, 9, 11 is defined as the surface area of the piston 7, 9, 11 projected on a plane extending perpendicular to the actuating direction 17. Effective outer surface areas of the first and second floating piston 7, 9 face towards the first and second cylinder cap 15, 17, respectively. Effective inner surface areas are those surface areas of the first and second floating piston 7, 9 facing towards the central piston 11. An effective first surface area of the central piston 11 faces towards the first cylinder cap 15 and an effective second surface area of the central piston 11 faces towards the second cylinder cap 17.

When the central piston 11 has reached the central position, the first floating piston 7 engages with the first end stop arrangement 35 which prevents a further movement of the first floating piston 7 towards the second cylinder cap 17. Hence, the effective surface area available for the working fluid to act on is the same on either side of the central piston 11. Hence, the central position is stable. As soon as the central piston 11 only moves the slightest bit out of the central position, it engages with one of the floating pistons 7, 9. For example, if the central piston 11 moves towards the second floating piston 9 and engages with the second floating piston 9, the effective surface area pushing the central piston 11 towards the first cylinder cap 15 is the combination of the effective outer surface area of the second floating piston 9 and the effective second surface area of the central piston 11. This effective surface area is considerably larger than the effective first surface area of the central piston 11 which remains for pushing the central piston 11 towards the second cylinder cap 17. Thus, the central piston 11 is immediately pushed back to the central position.

Finally, for moving the central piston 11 from the central position to a second (stable) position as close to the second cylinder cap 17 as possible, the pressure of the working fluid ingested through the second control opening 65 has to be reduced or preferably completely taken away.

The exemplary embodiment of a double-acting cylinder 1 shown in FIGS. 1 to 3 has the advantage that due to the two-section design of the floating pistons 7, 9 the effective outer surface area is considerably larger than the effective inner surface area. Thereby, it is ensured that if a working fluid is ingested into the cylinder bore 5 through the first or the second control opening 63, 65 the resulting force acting onto the respective floating piston 7, 9 is always directed towards the central piston 11. Furthermore, as the second seals 57 engage with an inner wall 59 of the central piston 11 and not with an inner wall 36 of the cylinder housing 3, the inner wall 36 of the cylinder housing 3 does not need to be machined as carefully in the central section 33 which reduces the manufacturing cost.

In addition, the double-acting cylinder 1 comprises an arrangement for sensing a position of the central piston 11. To this end a permanent magnet 67 is arranged in the central piston 11. The cylinder housing 3 comprises a sensor 69 which can be used to sense the position of the permanent magnet 67 and, thereby, the position of the central piston 11.

A second embodiment of a double-acting cylinder 1 is shown in FIGS. 4 to 6. For the sake of brevity only differences between the first embodiment shown in FIGS. 1 to 3 and the second embodiment will be discussed here. Further, to keep the Figures simple only those reference numerals will be repeated for FIGS. 4 to 9 that are essential for understanding the differences between the different embodiments.

The double-acting cylinder 1 shown in FIGS. 4 to 6 comprises a cylinder bore 5 with a smooth inner wall 71. In other words, a diameter or cross-section of the cylinder bore 5 is a constant over the entire length of the cylinder bore 5 from the first cylinder cap 15 to the second cylinder cap 17. Hence, the end stop arrangements 73, 75 are not formed by steps in the inner wall of the cylinder housing 3 but are instead provided at a free ends of the guiding sections 21, 23 of the cylinder caps 15, 17. In the embodiment of FIGS. 4 to 6 the end stop arrangements 73, 75 are provided in the form of ring-shaped protrusions which extend radially from the guiding sections 21, 23 towards the cylinder housing 3. This embodiment has the additional advantage that the cylinder housing 3 has a smooth inner wall 71 and does not need to provide sections of different diameter and the outer wall 60 of the central piston 11 has a smooth or continuous surface towards the inner wall 71 of the cylinder housing 3. This does not only make manufacturing of the cylinder housing 3 easier, it also reduces the overall dimensions and the weight of the double-acting cylinder 1 as the thickness of the cylinder housing 3 or cylinder wall can be reduced as compared to the example shown in FIGS. 1 to 3.

Finally, a third embodiment is shown in FIGS. 7 to 9. As before, only the differences compared to the first embodiment shown in FIGS. 1 to 3 will be described.

In this embodiment the central piston 11 is not double cup-shaped but comprises only a core 43 without any flanges. Thus, the second seals 57 of the first and second floating pistons 7, 9 directly engage with an inner wall 77 of the cylinder housing 3 in the central section 33 of the cylinder bore 5. In this embodiment venting openings 79 for supplying air to the venting cavities 61 are shown.

The third embodiment shares the advantages of the first and second embodiment related to the different size of the effective inner and outer surface areas of the floating pistons.

The invention claimed is:
1. A double-acting cylinder comprising:
a cylinder housing having an inner wall and defining a cylinder bore extending along an actuation direction of the cylinder with the cylinder bore having opposing ends delimited by respective first and second cylinder caps;
a first floating piston comprising first and second sections with a circumferential length of the first floating piston in a plane extending perpendicular to the actuation direction of the cylinder greater in the first section than in the second section;
a second floating piston comprising first and second sections with a circumferential length of the second floating piston in a plane extending perpendicular to the actuation direction of the cylinder greater first section than the second section;

a central piston having an inner wall and movable to three stationary positions along the actuation direction of the cylinder, wherein a movement of the first floating piston in the cylinder bore along the actuation direction of the cylinder is delimited towards the second floating piston by a first end stop arrangement, a movement of the second floating piston in the cylinder bore along the actuation direction of the cylinder is delimited towards the first floating piston by a second end stop arrangement, and a movement of the central piston in the cylinder bore along the actuation direction of the cylinder is delimited by the first and the second floating pistons;

a first seal arranged in the first section of each of the first and second floating pistons for a sealing engagement with the inner wall of the cylinder housing; and a second seal arranged in the second section of each of the first and second floating pistons for a sealing engagement with the inner wall of the central piston, wherein the movement of the first floating piston in the cylinder bore along the actuation direction of the cylinder and away from the second floating piston is delimited by the first cylinder cap, and the movement of the second floating piston in the cylinder bore along the actuation direction of the cylinder and away from the first floating piston is delimited by the second cylinder cap, wherein the first end stop arrangement is attached to the first cylinder cap, and the second end stop arrangement is attached to the second cylinder cap, wherein each of the first and second cylinder caps comprises a guiding section extending from the respective one of the first and second cylinder caps towards the central piston and spaced from the inner wall of the cylinder housing, wherein the first end stop arrangement is formed by a protrusion arranged at the guiding section of the first cylinder cap and the second end stop arrangement is formed by a protrusion arranged at the guiding section of the second cylinder cap, and wherein the first seal of the first floating piston is arranged for the sealing engagement with the inner wall of the cylinder housing, and the first seal of the second floating piston is arranged for the sealing engagement with the inner wall of the cylinder housing constantly over an entire length of the bore.

2. The double-acting cylinder according to claim 1, wherein a cross section of the cylinder bore in a plane extending perpendicular to the actuation direction of the cylinder is constant between the first cylinder cap and the second cylinder cap.

3. The double-acting cylinder according to claim 2, wherein the central piston comprises a first flange and a second flange, wherein the first flange extends from the central piston towards the first cylinder cap, is at least partially arranged between the inner wall of the cylinder housing and the second section of the first floating piston, and forms the inner wall of the central piston for sealing engagement with the second seal of the first floating piston, and wherein the second flange extends from the central piston towards the second cylinder cap, is at least partially arranged between the inner wall of the cylinder housing and the second section of the second floating piston, and forms the inner wall of the central piston for sealing engagement with the second seal of the second floating piston.

4. The double-acting cylinder according to claim 1, wherein the central piston comprises a first flange and a second flange, wherein the first flange extends from the central piston towards the first cylinder cap, is at least partially arranged between the inner wall of the cylinder housing and the second section of the first floating piston, and forms the inner wall of the central piston for sealing engagement with the second seal of the first floating piston, and wherein the second flange extends from the central piston towards the second cylinder cap, is at least partially arranged between the inner wall of the cylinder housing and the second section of the second floating piston, and forms the inner wall of the central piston for sealing engagement with the second seal of the second floating piston.

5. The double-acting cylinder according to claim 4, wherein the first flange has an outer wall and the second flange has an outer wall with the outer walls of the first and second flanges forming a continuous surface of the central piston towards the inner wall of the cylinder housing.

6. The double-acting cylinder according to claim 1, wherein the central piston comprises a permanent magnet with a position of the permanent magnet along the actuation direction detectable through the cylinder housing for determining a position of the central piston along the actuation direction of the cylinder.

7. The double-acting cylinder according to claim 6 further comprising a sensor to detect the position of the permanent magnet.

8. The double-acting cylinder according to claim 1 further comprising a piston rod attached to the central piston.

9. A double-acting cylinder comprising:

a cylinder housing having an inner wall and defining a cylinder bore extending along an actuation direction of the cylinder with the cylinder bore having opposing ends delimited by respective first and second cylinder caps;

a first floating piston comprising first and second sections with a circumferential length of the first floating piston in a plane extending perpendicular to the actuation direction of the cylinder greater in the first section than in the second section;

a second floating piston comprising first and second sections with a circumferential length of the second floating piston in a plane extending perpendicular to the actuation direction of the cylinder greater first section than the second section;

a central piston having an inner wall and movable to three stationary positions along the actuation direction of the cylinder, wherein a movement of the first floating piston in the cylinder bore along the actuation direction of the cylinder is delimited towards the second floating piston by a first end stop arrangement, a movement of the second floating piston in the cylinder bore along the actuation direction of the cylinder is delimited towards the first floating piston by a second end stop arrangement, and a movement of the central piston in the cylinder bore along the actuation direction of the cylinder is delimited by the first and the second floating pistons;

a first seal arranged in the first section of each of the first and second floating pistons for a sealing engagement with the inner wall of the cylinder housing; and a second seal arranged in the second section of each of the first and second floating pistons for a sealing engagement with the inner wall of the central piston, wherein the movement of the first floating piston in the cylinder bore along the actuation direction of the cylinder and away from the second floating piston is delimited by the first cylinder cap, and the movement of the second floating piston in the cylinder bore along the actuation direction of the cylinder and away from the first floating piston is delimited by the second cylinder cap, wherein the first end stop arrangement is attached to the first cylinder cap, and the second end stop arrangement is attached to the second cylinder cap, wherein each of the first and second cylinder caps comprises a guiding section extending from the respective one of the first and second cylinder caps towards the central piston and spaced from the inner wall of the cylinder housing, wherein the first end stop arrangement is formed by a protrusion arranged at the guiding section of the first cylinder cap and the second end stop arrangement is formed by a protrusion arranged at the guiding section of the second cylinder cap, and further comprising a piston rod attached to the central piston.

* * * * *